United States Patent [19]

Chang et al.

[11] Patent Number: 4,665,248

[45] Date of Patent: May 12, 1987

[54] ZEOLITE MODIFICATION AND ITS USE IN CONVERSION OF ALCOHOLS AND ETHERS TO HYDROCARBONS

[75] Inventors: Clarence D. Chang, Princeton; Joseph N. Miale, Lawrenceville, both of N.J.

[73] Assignee: Mobil Oil Corporation, New York, N.Y.

[21] Appl. No.: 787,184

[22] Filed: Oct. 15, 1985

Related U.S. Application Data

[60] Division of Ser. No. 631,687, Jul. 16, 1984, Pat. No. 4,559,315, which is a continuation-in-part of Ser. No. 465,987, Feb. 14, 1983, Pat. No. 4,513,091.

[51] Int. Cl.$^4$ ............................................. C07C 1/20
[52] U.S. Cl. .................................. 585/408; 585/415; 585/467; 585/469; 585/470; 585/475; 585/481; 585/640; 585/654; 585/733; 208/116; 208/120
[58] Field of Search ............... 585/640, 639, 638, 469, 585/408, 733

[56] References Cited

U.S. PATENT DOCUMENTS

| | | | |
|---|---|---|---|
| Re. 31,919 | 6/1985 | Butter et al. | 502/66 |
| 4,284,529 | 8/1981 | Shibabi | 502/77 |
| 4,329,533 | 5/1982 | Chu | 585/466 |
| 4,377,469 | 3/1983 | Shibabi | 502/77 |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |
| 4,435,516 | 3/1984 | Chang et al. | 502/71 |
| 4,440,630 | 4/1984 | Oleck et al. | 208/111 |
| 4,443,554 | 4/1984 | Dessau | 502/71 |
| 4,444,900 | 4/1984 | Chang et al. | 502/71 |
| 4,444,902 | 4/1984 | Chang et al. | 502/86 |
| 4,458,024 | 7/1984 | Oleck et al. | 502/66 |
| 4,461,845 | 7/1984 | Dessau et al. | 502/27 |
| 4,468,475 | 8/1984 | Kuehl | 502/71 |
| 4,477,582 | 10/1984 | Miale | 502/26 |
| 4,478,950 | 10/1984 | Chu | 502/85 |
| 4,500,418 | 2/1985 | Miale et al. | 585/480 |
| 4,500,419 | 2/1985 | Miale et al. | 585/481 |
| 4,500,420 | 2/1985 | Miale et al. | 585/481 |
| 4,500,421 | 2/1985 | Chang et al. | 585/481 |
| 4,500,422 | 2/1985 | Miale et al. | 585/481 |
| 4,512,876 | 4/1985 | Miale et al. | 585/481 |
| 4,513,091 | 4/1985 | Chang et al. | 502/71 |
| 4,515,682 | 5/1985 | Chang et al. | 585/481 |
| 4,517,075 | 5/1985 | Dessau et al. | 585/481 |
| 4,524,140 | 6/1985 | Chang et al. | 502/71 |
| 4,526,880 | 7/1985 | Chu et al. | 502/71 |
| 4,538,014 | 8/1985 | Miale et al. | 585/408 |
| 4,538,015 | 8/1985 | Miale et al. | 585/408 |
| 4,538,016 | 8/1985 | Miale et al. | 585/408 |
| 4,540,840 | 9/1985 | Miale et al. | 585/640 |
| 4,540,841 | 9/1985 | Miale et al. | 585/640 |
| 4,559,131 | 12/1985 | Miale | 585/481 |
| 4,559,315 | 12/1985 | Chang et al. | 502/71 |
| 4,563,435 | 1/1986 | Chu et al. | 502/71 |

*Primary Examiner*—Asok Pal
*Attorney, Agent, or Firm*—Alexander J. McKillop; Michael G. Gilman; Dennis P. Santini

[57] ABSTRACT

The ion-exchange capacity and acid catalytic activity of a ZSM-5 type zeolite are increased by treatment of a physical mixture of the zeolite and an inorganic oxide with water in the presence of an alkali metal cation.

Specifically, the catalyst is prepared by contacting a mixture of a crystalline zeolite having a silica to alumina ratio above 12 and a Constraint Index between about 1 and about 12, and a solid source of aluminum with liquid water in the presence of an activating amount of an alkali metal cation and under a combination of conditions including a temperature up to about 370° C. for less than about an hour to about 100 hours to induce increased activity to the zeolite.

4 Claims, No Drawings

ZEOLITE MODIFICATION AND ITS USE IN CONVERSION OF ALCOHOLS AND ETHERS TO HYDROCARBONS

CROSS REFERENCE TO RELATED APPLICATONS

This is a division of U.S. patent application Ser. No. 631,687 filed July 16, 1984 now U.S. Pat. No. 4,559,315, which is a continuation-in-part of copending U.S. patent application Ser. No. 465,987 filed Feb. 14, 1983, now U.S. Pat. No. 4,513,091.

FIELD OF THE INVENTION

This invention relates to a method for modifying the structure of crystalline zeolites and to the products thereby produced. It particularly relates to a modification whereby the acidic catalytic activity of the zeolite is increased. It more particularly relates to a method for increasing the acidic catalytic activity of ZSM-5 type zeolites and to the products formed by this method. It further relates to an improved catalytic process for converting methanol to hydrocarbons.

BACKGROUND OF THE INVENTION

Zeolite catalysts have become widely used in the processing of petroleum and in the production of various petrochemicals. Acid catalyzed reactions such as cracking, hydrocracking, catalytic dewaxing, alkylation, dealkylation, transalkylation, isomerizaion, polymerization, addition, disproportionation, conversion of methanol to hydrocarbons, and other acid catalyzed reactions may be performed with the aid of these catalysts. Both natural and synthetic zeolites are known to be active for these reactions.

The common crystalline zeolite catalysts are the aluminosilicates such as Zeolites A, X, Y and mordenite. Structurally, each such material can be described as a robust three dimensional framework of $SiO_4$ and $AlO_4$ tetrahedra that are crosslinked by the sharing of oxygen atoms whereby the ratio of total aluminum and silicon atoms to oxygen is 1:2. These structures (as well as other crystalline zeolites of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

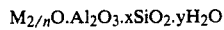

$$M_{2/n}O \cdot Al_2O_3 \cdot xSiO_2 \cdot yH_2O$$

wherein M is a cation with valence n, x has a value of from 2 to 10, and y has a value which depends on the pore volume of the particular crystal structure under discussion. The empirical oxide formula may be rewritten as a general "structural" formula

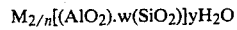

$$M_{2/n}[(AlO_2) \cdot w(SiO_2)]yH_2O$$

wherein M and y are defined as above, and wherein w has a value from 1 to 5. In this representation, the composition of the robust framework is contained within the square brackets, and the material (cations and water) contained in the channels is shown outside the square brackets. One skilled in the art will recognize that x in the empirical oxide formula represents the mole ratio of silica to alumina in the robust framework of a crystalline zeolite, and shall be referred to herein simply by the expression in common usage, i.e. "the silica to alumina ratio". (See "Zeolite Molecular Sieves", Donald W. Breck, Chapter One, John Wiley and Sons, New York, N.Y. 1974, which is incorporated herein by reference as background material).

With few exceptions, (such as with Zeolite A wherein x=2) there are fewer alumina tetrahedra than silica tetrahedra in the robust frameworks of the crystalline zeolites. Thus, in general, aluminum represents the minor tetrahedrally coordinated constituent of the robust frameworks of the common zeolites found in nature or prepared by the usual synthetic methods that employ only inorganic reagents.

For the above common zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it aquires a large catalytic activity measured by the alpha activity test for cracking n-hexane, which test is more fully described below. And, the ammonium form itself desorbs ammonia at high temperature in a characteristic fashion.

It is generally recognized that the composition of the robust framework of the synthetic common zeolites, wherein x=2 to 10, may be varied within relatively narrow limits by changing the proportion of reactants, e.g., by changing the concentration of the silica relative to the alumina in the zeolite forming mixture. However, definite limits, for example in the maximum obtainable silica to alumina ratio, are observed. Synthetic faujasites having a silica to alumina ratio of about 5.2 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit for synthetic faujasite in a preparative process using conventional reagents. Corresponding limits in the silica to alumina ratio of mordenite and erionite via the synthetic pathway are also observed.

A class of synthetic high silica content crystalline zeolites wherein x is at least 12, has recently been discovered. In general, such zeolites are made from a forming solution which contains an organic template. Unlike the common synthetic zeolites, these high-silica content zeolites appear to have no natural counterpart. Members of this new class of zeolites have many advantageous properties, which properties generally include a high degree of structural stability. They are used or have been proposed for use in various processes, especially catalytic processes. Known materials of this type include, for example, ZSM-beta (U.S. Pat. No. 3,308,069), ZSM-5 (U.S. Pat. No. 3,702,886), ZSM-11 (U.S. Pat. No. 3,709,979), and ZSM-12 (U.S. Pat. No. 3,832,449).

Unlike the common zeolites described above wherein x=2 to 5, the silica to alumina ratio for at least some of the high silica content zeolites is unbounded, i.e. the ratio may be infinitely large. ZSM-5 is one such example. U.S. Pat. No. Re. 29,948 to Dwyer et al. discloses a crystalline organosilicate essentially free of aluminum and exhibiting an X-ray diffraction pattern characteristic of ZSM-5 type aluminosilicates. Some other high silica content zeolites, however, appear to behave more like the common zeolites in that the upper limit of the compositional range of the crystals is fixed regardless of the silica content of the forming solution.

It is sometimes desirable to obtain a particular zeolite, for any of several reasons, with a higher or a lower silica to alumina ratio than is available by direct synthesis. With ion-exchange applications, for example and for catalytic reactions such as hydrocracking which require high acidity catalysts, low silica to alumina ratios are favorable. For structural stability to heat and steam, or high-temperature xylene isomerization, high silica to alumina ratios are required.

Commonly assigned U.S. patent application Ser. No. 573,776, filed Jan. 23, 1984, discloses and claims a method for producing an improved catalyst from a composite of a crystalline aluminosilicate zeolite having a silica to alumina ratio of at least 100 and a Constraint Index from 1 to 12 and an activating metal oxide comprising alumina by contacting the catalyst with water at 200° C. to 500° C. ZSM-5 is specifically recited. There appears to be no recognition therein of the advantageous effect of treatment with liquid water in the presence of an alkali metal cation. Commonly assigned U.S. patent application Ser. No. 488,505 filed Apr. 25, 1983 describes and claims a method for enhancing the activity of a high silica content crystalline zeolite by contact with a solution containing organic cations and aluminum ions at a pH of at least 7 under autogenous pressure at 50° C. to 300° C. No requirement appears therein for an external solid source of alumina.

It is an object of this invention to provide a facile method for increasing the acid catalytic activity of a high silica content zeolite. It is a further object of this invention to increase the alumina content of the robust framework of a ZSM-5 type zeolite. It is a still further object of this invention to increase the ion exchange capacity of a zeolite. A still further object is to provide novel zeolite compositions. A still further object is to provide a novel process for converting lower alcohols including methanol to hydrocarbons having a carbon chain length longer than the alcohol feed.

BRIEF SUMMARY OF THE INVENTION

We have now found an unexpectedly facile method for modifying the composition of the robust framework of a ZSM-5 type catalyst. When a physical mixture of the zeolite and a solid source of alumina is treated with liquid water in the presence of an alkali metal cation, the alumina content of the robust framework and the acid catalytic activity of the zeolite are readily increased. This modification of the zeolite is preferably induced by treatment with a continuous phase of liquid water having a pH of at least 7. The treatment advantageously is conducted in the absence of organic amines. Although the treatment may be conducted over the broad temperature range of about 1° C. to 370° C., i.e. below the critical temperature of water, under the preferred conditions recited extensive increase in acid catalytic activity may be achieved at or below the normal boiling point of water, as more fully described hereinbelow.

We have also found that the treatment may be used to increase the acid catalytic activity of a virgin ZSM-5 type zeolite having a silica to alumina ratio of about 70:1 to as high as about 26000:1, as well as of ZSM-5 type catalysts which have become deactivated in use.

In another aspect of this invention, we have found a novel process for converting methanol to hydrocarbons by use of a catalyst prepared by the method of this invention.

DETAILED DESCRIPTION AND SPECIFIC EMBODIMENTS

The high silica content zeolite treated by the method of this invention is of the ZSM-5 type, exemplified by ZSM-5, ZSM-11, ZSM-12, ZSM-23, ZSM-35, ZSM-38 and ZSM-48, as more fully described hereinbelow. The treatment is conducted with a physical mixture of the zeolite and a solid source of aluminum. The solid source of aluminum, which is believed to furnish the aluminum for insertion into the robust framework of the zeolite, may be in the form of discrete beads of alumina, or it may be present as the alumina binder in an extrudate formed from a mixture of the zeolite and alpha alumina monohydrate, for example. Both of the foregoing variants exemplify physical mixtures for purposes of the present invention. The proportions of the zeolite and solid source of aluminum are not believed to be critical, and the physical mixture may contain 1 wt% to 99 wt%, preferably 15 wt% to 85 wt% of the solid source of aluminum. It has been observed that an intimate mixture, such as provided by an extrudate, activates more readily compared with a less intimate mixture such as that provided by discrete alumina beads, but as will be seen below both are effective. It is a feature of this invention that discrete alumina beads may be used to treat a zeolite either incorporated with or to be incorporated with an aluminum-free binder.

Although the preferred solid source of aluminum is an alumina, one skilled in the art will recognize that other solids comprising alumina may be used. Such solids which may be used either with or without prior treatment, include silica-alumina gels, clays such as attapulgite, montmorillonite, alumina hydrosols, and Dixie and Mac Namee clays.

For purposes of the method of this invention, the solid source of aluminum, such as an alumina, may be the sole source of aluminum.

The activation method of this invention is exceedingly simple. The physical mixture of ZSM-5 type zeolite and solid source of aluminum is treated with liquid water at a temperature below its critical temperature, i.e. below about 370° C., in the presence of an activating amount of an alkali metal cation for a time effective to induce increased activity. The amount of liqid water required is at least that amount sufficient to fill the pores of the physical mixture to be treated. However, for maximum effectiveness, and for best repeatability and control of the activation process, it is preferred to use sufficient excess liquid water so that a portion or all of the physical mixture is submerged in liquid water, i.e. it is preferred to conduct the activation in a continuous phase of liquid water. Although the method of this invention may be practiced over the whole range of temperature at which water remains liquid, i.e. from above 1° C. to 370° C., an outstanding feature is that activation is so facile that the normal boiling point of water often need not be exceeded. As will be shown by example, very substantial activation is observed at room temperature. A particularly preferred embodiment is to conduct the activation under reflux at about the normal boiling point of water, under which conditions the activity of a ZSM-5 sample, in as little as 2 hours, may be increased about 20-thousand fold from a hexane cracking activity of about 0.02 to 450.

The above described treatment is conducted in the presence of an alkali metal cation such as a lithium, sodium or potassium cation. Small amounts of alkali metal cation may be present. These cations may be furnished, for example, by converting the zeolite to the lithium, sodium or potassium form prior to activation, and adding distilled water for activation. However, the alkali metal cation may be added to the water. It may be furnished as the hydroxide, the alkali metal salt of a weak acid having a dissociation constant in water less than about $10^{-4}$, or as a mixture thereof, which is dissolved in the treatment water. Particularly preferred sources of alkali metal cations are sodium or potassium hydroxide, the sodium or potassium salts of acetic, carbonic and phosphoric acid, and mixtures thereof. The amount of alkali metal cation to be used may vary depending on the source of the cation, but in all instances an activating amount is used, i.e. an amount effective to increase by a substantial amount, such as 25%, the acid catalytic activity over that observed by the same treatment conducted with the same physical mixture in the absence of said cation. The term "alkali metal" as used herein means a metal of the group consisting of lithium, sodium, potassium, rubidium and caesium.

In the embodiment of the present invention practiced with a continuous liquid water phase as described above, the liquid phase including dissolved source of alkali metal cation is adjusted if necessary to a pH of at least about 7, and preferably to a pH of about 7 to about 12. As will be seen from the examples, optimal activation is fostered by an optimal concentration of hydroxyl ion. While this is not completely understood, it is believed that exposure of the physical mixture to excessive hydroxyl ion concentration under a given set of conditions leads to an excessive, counterproductive loss of crystallinity.

For the foregoing reasons, it is difficult to describe exactly what combinations of time and temperature conditions are most effective for activation of a specific zeolite with a specific amount or source of alkali metal cation. Nonetheless, with a given zeolite, it is a relatively simple matter to determine, with a few selected tests, an effective and even optimal operating range. Broadly, these will be within a temperature of 1° C. up to 370° C., for a time less than about 1 hour to 100 hours. A preferred temperature range is from about 10° C. to about 200° C., with about 20° C. to about 212° C. particularly preferred. For any of these temperature ranges, the preferred treatment time is from about less than 1 hour to 24 hours.

The treatment described in this invention preferably is conducted in the absence of organic nitrogen compounds. It may be practised broadly with a ZSM-5 type zeolite having a silica to alumina ratio greater than about 12, and in particular with a silica to alumina ratio greater than about 60:1, greater than 500:1 and greater than 1600:1. Novel products of the ZSM-5 type may be produced therefrom having silica to alumina ratios of less than about 60:1.

It is believed that understanding of this invention will best be furthered now by consideration of the Examples. These examples are not to be construed as limiting the scope of the invention, said scope being defined by this entire specification, including appended claims. All alpha values shown in the examples are determined after conversion of the zeolite to the hydrogen form unless explicitly stated to be otherwise.

EXAMPLES

EXAMPLES 1 TO 7

The ammonium form of a sample of ZSM-5 having a silica to alumina ratio of 26000:1 and hexane cracking activity (alpha value) of 0.02 (65 parts by weight) is wet milled with alpha alumina monohydrate (35 parts) and extruded into cylindrical pellets having a diameter of about 2 mm., dried and calcined. Samples of this material are covered with water or sodium hydroxide solution in an open tube and maintained at different temperatures for varying amounts of time. For temperatures above 100° C., an autoclave was used. The apparatus employed comprises a steel autoclave equipped with temperature and pressure measuring devices and an internal sample support for holding open top test tubes, during treatment. A quantity of water is contained in the autoclave bottom, with test tubes being suspended in the liquid water. During the treatment the autoclave is heated to treatment temperature. The water vaporizes to form a saturated gas phase in equilibrium with the liquid phase at elevated temperature. The activated extrudate samples were recovered, post-treated with ammonium nitrate to base-exchange the catalyst, and calcined at 540° C. to convert them to the hydrogen form. The catalytic activity for cracking hexane (alpha activity) was then measured. The results are tabulated below:

TABLE I

| Example No. | Temp. (°C.) | Time | Alpha Activity | Notes |
| --- | --- | --- | --- | --- |
| 1 | 165 | 1 day | 41 | Water |
| 2 | 100 | 8 days | 4.5 | Water |
| 3 | 170 | 1 day | 33 | Water |
| 4 | 165 | 1 day | 195 | 1N NaOH |
| 5 | 165 | 1 day | 72 | 0.2N NaOH |
| 6 | 25 | 1 day | 0.6 | 1N NaOH |
| 7 | 173 | 14 hrs. | 23 | Water |

EXAMPLES 8-10

The above procedure is repeated except that different samples are treated simultaneously in the sealed autoclave at 130° C. for 64 hours and then at 170° C. for 24 hours. Control example 8 contains no alumina and consists of HZSM-5(alpha=0.015). Example 9 in an extruded mixture of the particulate zeolite and alpha-alumina monohydrate binder in equal weight portions. Example 10 is an equal mixture of the zeolite with gamma alumina beads slurried with water. Loss of water during treatment was noted in Example 10 because the product, on removal, was dry. The results are shown in Table II.

TABLE II

| Example No. | Alumina | Treatment | Alpha Activity |
| --- | --- | --- | --- |
| 8 | nil | none | 0.015 |
| 9 | binder | hydrothermal | 41 |
| 10 | beads | hydrothermal | 7 |

This comparative experimentation shows that greater enhancement is obtained by more intimate contact between the solid materials such as was provided by alumina binder.

EXAMPLES 11 TO 15

The procedure of Example 10 is repeated using an admixture of HZSM-5 and alpha-$Al_2O_3$ beads, except that the heating period is 1 day. The results are shown in Table III. Water loss was noted in Example 13.

EXAMPLES 16 TO 18

Portions of the same zeolite as that used in Example 1 were wet mulled with sodium aluminate, placed in test tubes, and treated in an excess of water at 165° C. in the autoclave. The parts by weight of sodium aluminate per part of zeolite were as shown in Table IV. Example 17 lost water during treatment.

TABLE IV

| Example No. | Act. Agent | Alpha Activity | Note |
| --- | --- | --- | --- |
| 16 | $NaAlO_2$ | 148 | 0.6 parts |
| 17 | $NaAlO_2$ | 27 | 0.1 parts |
| 18 | $NaAlO_2$ | 223 | 0.5 parts |

EXAMPLE 19

A sample of commercial Nickel-HZSM-5 extrudate prepared from 65 wt% ZSM-5 having a 70:1 silica to alumina ratio (and containing about 1 wt% nickel) and 35 wt% of alumina was tested for hexane cracking activity. Two minutes before sampling, 5 ml of $H_2S$ was added to the charge to minimize cracking due to nickel. The alpha value was found to be 56.

EXAMPLE 20

A 2-gram sample of the same catalyst described in Example 19 was covered with 20 ml 0.2N $NaHCO_3$ in a teflon tube, capped to avoid loss of water, and placed in the sealed 500 ml autoclave containing 150 ml $H_2O$ to satisfy autogenous pressure requirements. It was heated overnight at 155° C. The product was exchanged for 60 hours (weekend) with 1-N $NH_4NO_3$ at ambient temperature. It was then washed, dried at 130° C., and tested for hexane cracking as in Example 19. The alpha value was 80.

EXAMPLE 21

A 2-gram aliquot of the catalyst from Example 19 was treated as in Examples 20 except that 20 ml 0.2N potassium acetate instead of $NaHCO_3$ was used as the activator. The solution had an initial pH of 7.1 and a pH of 6.7 after use. The catalyst was tested as in Example 19 and was found to have an alpha value of 88.

EXAMPLE 22

A 2-gram aliquot of the catalyst from Example 19 was treated as in Examples 20 and 21 except that sodium phosphate ($Na_2HPO_4$) was used as the activator. The initial pH was 8.4 and decreased to 7.1 during treatment. The alpha value of the treated catalyst was 123.

EXAMPLE 23

A 2-gram sample of HZSM-5 extrudate that contained 35 wt% alumina and 65 wt% zeolite with a silica to alumina ratio of 70:1, and having an alpha value of about 225, was refluxed for 3 hours with 0.2N NaOH, washed, exchanged with 1N $NH_4NO_3$ as in Example 19, dried and tested for hexane cracking activity. The alpha value was 275.

EXAMPLE 24

A sample of ZSM-5 zeolite having a silica to alumina ratio of 70:1, in the sodium form, was immersed in distilled water and treated for 4 hours at 88° C. in a shaker flask. It was then tested for its activity for converting methanol to hydrocarbons. For this purpose, methanol was passed over a fixed bed of the treated catalyst at 370° C. and 1 LHSV (liquid hourly space velocity). Very low conversion was observed. Conversion and product distribution are shown in Table V.

EXAMPLE 25

The same sodium ZSM-5 zeolite as used in Example 24 was extruded with 35% alumina by weight, and the extrudate was subjected to treatment with water for 4 hours at 88° C. as in Example 24. Its methanol conversion activity tested at the same conditions used in Example 24 was very high. Conversion and product distribution are shown in Table V.

TABLE V

| | Example 24 | Example 25 |
| --- | --- | --- |
| Conversion (based on —$CH_2$— content) | 0.5% | 94% |
| Normalized Product Distribution, % | | |
| $C_1$–$C_5$ Paraffins | 67.7 | 31.1 |
| $C_2$–$C_5$ Olefins | 18.8 | 17.4 |
| $C_6+$ Aliphatics | — | 24.3 |
| Aromatics | — | 27.2 |
| Coke | 13.5 | less than 0.1 |

EXAMPLES 26–30

Samples of an extrudate that contained 65 wt% high silica ZSM-5 ($SiO_2/Al_2O_3=26,000$) in alumina were refluxed for 2 hours in aqueous NaOH solutions of various concentrations. The samples were then removed from the alkaline medium and ion-exchanged in excess 1N $NH_4NO_3$ at reflux for 2 hours. A second exchange with fresh $NH_4NO_3$ was then carried out. The samples were washed, dried at 120° C. and calcined at 538° C.

The treated extrudates were tested for n-hexane cracking activity. Results are plotted in FIG. 1 as alpha vs NaOH concentration. The starting material had an alpha=0.02 (based on zeolite content). It is seen from FIG. 1 that with increasing NaOH concentration, alpha increases to 450 at 0.2N NaOH, and drops back to 1.2 at 1N NaOH. The Constraint Index (CI) of the highest activity sample was found to be 7.9.

Examination of the product of Example 28 (alpha=450) showed the zeolite to be 71% crystalline compared with the untreated extrudate (100% crystalline), and to display orthorhombic symmetry characteristic of ZSM-5 material with relatively low silica to alumina ratio. Sorption of 2-2 dimethylbutane was slightly diminished, consistent with crystallinity.

Further examination of the product of Example 28, converted to the ammonium form, showed a single desorption peak at 437° C., characteristic of normal ZSM-5 Bronsted acidity. The ion-exchange capacity measured by this method was 0.56 milliequivalents per gram, corresponding to a silica to alumina ratio of 37:1.

EXAMPLE 31

The same extrudate as used in Examples 26–30 was treated at room temperature overnight with 0.2N NaOH. The product, after exchange with ammonium salt and calcination, had an alpha value of 14.

Detailed Description of ZSM-5 type Zeolites

The zeolite that is treated by the method of this invention is of the ZSM-5 type.

The ZSM-5 type zeolites are members of a novel class of zeolites that exhibit unusual properties. Although these zeolites have unusually low alumina contents, i.e. high silica to alumina ratios of at least 12, they are very active even when the silica to alumina ratio exceeds 30. The activity is surprising since catalytic activity is generally attributed to framework aluminum atoms and/or cations associated with these aluminum atoms. These zeolites have an intracrystalline sorption capacity for normal hexane which is greater than that for water, i.e. they exhibit "hydrophobic" properties. It is believed that this hydrophobic character is advantageous in the present invention.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

The ZSM-5 type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective. 12-membered rings usually do not offer sufficient constraint to produce the advantageous conversions, although the puckered 12-ring structure of TMA offretite shows constrained access. Other 12-ring structures may exist which, due to pore blockage or to other cause, may be operative.

Rather than attempt to judge from crystal structure whether or not a zeolite possesses the necessary constrained access to molecules larger than normal paraffins, a simple determination of the "Constraint Index", or C.I., as herein defined may be made by passing continuously a mixture of an equal weight of normal hexane and 3-methylpentane over a small sample, approximately one gram or less, of zeolite at atmospheric pressure according to the following porcedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log \text{(fraction of n-hexane remaining)}}{\log \text{(fraction of 3-methylpentane remaining)}}$$

The Constraint Index approximates the ratio of the cracking rate constants for the two hydrocarbons. Zeolites suitable for the present invention are those having a Constraint Index of 1 to 12. C.I. values for some typical zeolites are:

TABLE VI

| CAS | C.I. |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

For ZSM-5 type zeolites of very high silica to alumina ratio, such as 1600:1, the Constraint Index cannot be measured reliably because of the low activity of the zeolite. In such cases reliance on X-ray pattern is useful. Many such zeolites, after activation by the method of this invention, become active enough to make Constraint Index evaluation feasible.

The class of zeolites defined herein is exemplified by ZSM-5, ZSM-11, ZSM-12, ZSM-21, ZSM-23, ZSM-35, ZSM-38, ZSM 48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic cations from the forming solution. These cations are removed by heating in an inert atmosphere at 1000° F. for one hour, for example, followed by base exchange with ammonium salts followed by calcination at 1000° F. in air.

The ZSM-5 type zeolites referred to herein have a crystal framework density, in the dry hydrogen form, of not less than about 1.6 grams per cubic centimeter. The dry density for known crystal structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between crystal but will not penetrate the intracrystalline free space.

Crystal framework densities of some typical zeolites which may be restored by the method of this invention, including some which are not within the purview of this invention, are:

TABLE VII

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The ZSM-5 zeolites that are treated by the method of this invention may be incorporated in another material usually referred to as a matrix or binder. Such matrix materials include synthetic or naturally occuring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina and silica-magnesia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

The term "acid catalytic activity" as used herein refers to the effectiveness of the zeolite, when in suitable form, for catalyzing reactions known to be promoted by so-called acid catalysts. Catalytic cracking, hydrocracking, skelatal isomerization, catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the reference standard have about the same activity. The alpha test is described in U.S. Pat. No. 3,354,078 and in The Journal of Catalysis, Vol. IV, pp. 522–529 (August 1965), both of which are incorporated herein by reference. Measurement of the "alpha value" is useful to assess the extent of catalyst activity before treatment, and also the degree of activation achieved with any sample treated by the method of this invention. For this purpose, the zeolite is converted to the hydrogen form before evaluation. However, other conversions also may be used to assess catalytic activity, and the zeolite need not always be in the hydrogen form, as illustrated above by Examples 24–25 wherein methanol conversion is used.

The method of this invention is believed to effect insertion of aluminum into the robust framework of the zeolite, without substantial change of the crystal structure, i.e. a ZSM-5 type zeolite product is produced. The increased ion-exchange capacity of the product may be measured by ordinary ion-exchange techniques, or by temperature programmed desorption of ammonia. The ammonia desorption/TGA technique is described in a publication by G. T. Kerr in Thermochemica Acta, Vol. 3, p. 113 (1971), the contents of which are incorporated herein by reference.

The products produced by this invention are at least partially in the alkali metal form. They may be converted to the hydrogen or to any other form suitable for a particular application by methods known to those skilled in the art.

What is claimed is:

1. A method for converting a lower alcohol feed selected from the group consisting of one or more alcohols having one to four carbon atoms and the ethers thereof to hydrocarbons having a carbon chain length greater than said feed, which method comprises contacting said feed under conversion conditions with a catalyst comprising a crystalline zeolite having a silica to alumina ratio above 12 and a Constraint Index between about 1 and about 12 physically mixed with a solid source of aluminum, said physical mixture having been activated prior to said contacting step by the process comprising treatment with liquid water in the presence of an activating amount of an alkali metal cation and under a combination of conditions including a temperature up to about 370° C. for less than about one hour to about 100 hours, said combination being effective to induce said increased activity.

2. The method of claim 1 wherein said zeolite is ZSM-5.

3. The method of claim 1 wherein said feed is methanol and/or dimethyl ether.

4. The method of claim 3 wherein said zeolite is ZSM-5.

* * * * *

UNITED STATES PATENT AND TRADEMARK OFFICE
CERTIFICATE OF CORRECTION

PATENT NO. : 4,665,248

DATED : May 12, 1987

INVENTOR(S) : Clarence D. Chang et al

It is certified that error appears in the above-identified patent and that said Letters Patent is hereby corrected as shown below:

Col. 4, line 51, "liqid" should be --liquid--
Col. 7, line 7, insert the following TABLE III

--TABLE III

| Example No. | Temp. (°C) | Alpha Activity | Note |
|---|---|---|---|
| 11 | 165 | 7 | Water |
| 12 | 100 | 0.3 | Water |
| 13 | 170 | 2 | Water |
| 14 | 165 | 0.5 | Steam Only |
| 15 | 165 | 81 | 1-N NaOH Solution-- |

Signed and Sealed this

Twenty-second Day of September, 1987

Attest:

DONALD J. QUIGG

Attesting Officer    Commissioner of Patents and Trademarks